JOHN M. THATCHER.
Improvement in Elbows for Hot-Air Pipes.
No. 115,785. Patented June 6, 1871.
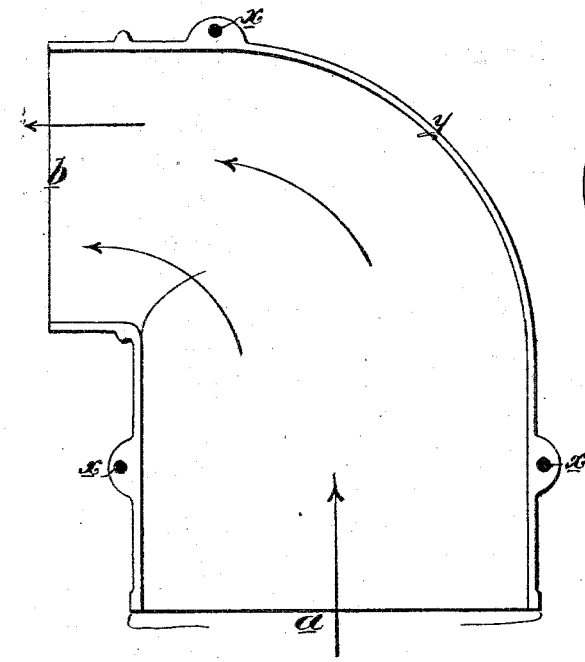
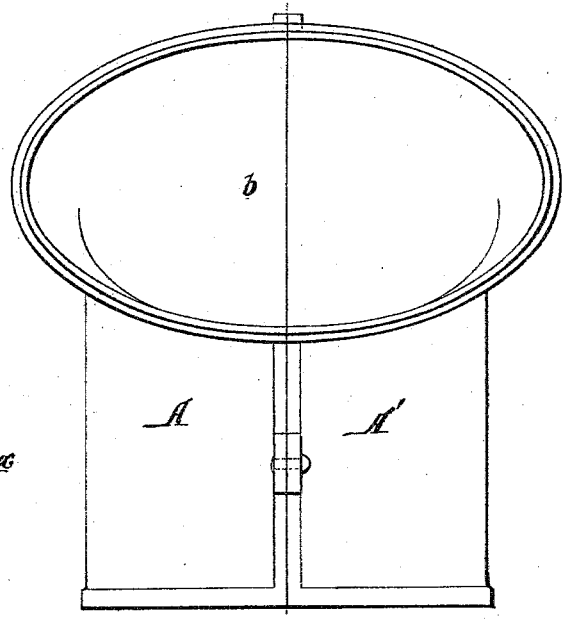
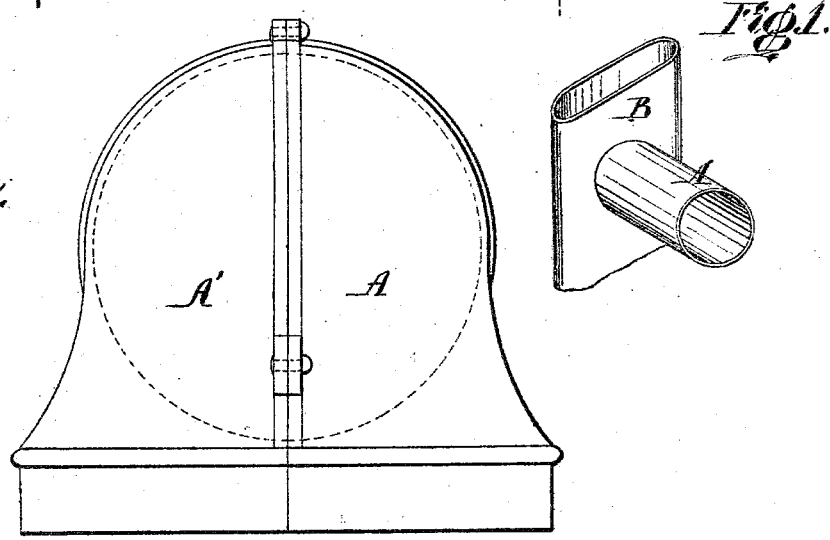

115,785

UNITED STATES PATENT OFFICE.

JOHN M. THATCHER, OF JERSEY CITY, NEW JERSEY.

IMPROVEMENT IN ELBOWS FOR HOT-AIR PIPES.

Specification forming part of Letters Patent No. 115,785, dated June 6, 1871.

I, JOHN M. THATCHER, of Jersey City, county of Hudson, State of New Jersey, have invented an Improved Elbow for Hot-Air Pipes, of which the following is a specification:

Nature and Object of the Invention.

My invention consists of an elbow having two branches—one for attachment to a cylindrical pipe, and the other to be connected to a flattened pipe, all as described hereafter; the object of the said elbow being to effect such a junction of the main pipes of heaters with the flattened distributing-pipe that there shall be less interference with the passage of the hot air than through joints as heretofore used, and so that the necessary junction can be accomplished without the tedious manipulation required by the ordinary plan of operating these pipes.

Description of the Accompanying Drawing.

Figure 1 is a perspective view representing the ordinary method of joining the main pipe to the flattened distributing-pipe of a heating-furnace; Fig. 2, a side view of one of the sections of my improved elbow; Fig. 3, an end view of the elbow; and Fig. 4, a plan view of the same.

General Description.

In heating buildings with hot air it is usual to make the main pipes, which are situated in the cellars, cylindrical, while the distributing-pipes are flattened so as to pass upward through the necessarily contracted flues in the wall. The junction of the cylindrical with the flattened pipes has heretofore been accomplished in the manner illustrated in Fig. 1, A representing the cylindrical and B the distributing pipe. This plan of joining the pipes not only involves much tedious manipulation, but the junction is so abrupt as to interfere to a considerable extent with the free passage of heated air from the main to the distributing pipe. My improved elbow has been designed with a view of remedying these evils. In the present instance the elbow is made of light cast-iron, and in two sections riveted together at $x\ x\ x$, as shown in the drawing, the elbow having a circular branch, $a$, for receiving the end of the main cylindrical pipe, while the other branch $b$ is made oval, or of any other figure adapted to the flattened distributing-pipe, the back $y$ of the elbow being rounded, as shown, so as to direct the hot air toward and through the branch $b$, thereby avoiding the ordinary abrupt junction, which, as before remarked, interferes with the free passage of the air from the main to the distributing-pipe. In the present instance the branch $b$ is of an oval form, and this shape gradually disappears into the circular shape of the branch $a$; but the branch $b$ may be, at its orifice, of the oblong shape shown by dotted lines in Fig. 3, or the orifice may have straight sides and rounded ends, according to the shape of the flattened distributing-pipe which has to be fitted to it.

It will be apparent that elbows such as have been used for connecting pipes of different diameters merely will not accomplish the end for which the elbow above described is intended—viz., the connecting of a pipe having one form to one of a different sectional shape. It will also be seen that the elbow may be cast in one piece, or made of sections of sheet metal struck up to the desired shape.

Claim.

An elbow, the branches of which are arranged at right angles, or nearly so, to each other, and are of different forms, one being adapted to a flattened pipe, and another to a cylindrical pipe, as set forth.

In testimony whereof I have signed my name to this specification in the presence of two subscribing witnesses.

JOHN M. THATCHER.

Witnesses:
 WM. A. STEEL,
 LOUIS BOSWELL.